United States Patent [19]

Hicks et al.

[11] 3,764,851
[45] Oct. 9, 1973

[54] CURRENT LIMITING DEVICE

[75] Inventors: John M. Hicks, Verona; Derek A. Paice, Murraysville, both of Pa.

[73] Assignee: Westinghouse Electric Corporation, Pittsburgh, Pa.

[22] Filed: Oct. 13, 1972

[21] Appl. No.: 297,525

[52] U.S. Cl. .................. 317/11 C, 317/20, 317/78, 200/144 AP
[51] Int. Cl. ............................................. H02h 7/22
[58] Field of Search ..................... 317/11 C, 78, 20; 200/144 AP

[56] References Cited
UNITED STATES PATENTS

| | | | |
|---|---|---|---|
| 1,717,260 | 6/1929 | Rankin | 317/11 C |
| 2,916,588 | 12/1959 | Wood | 317/11 C |

*Primary Examiner*—J. D. Miller
*Assistant Examiner*—Harvey Fendelman
*Attorney*—F. H. Henson et al.

[57] ABSTRACT

This disclosure relates to a current limiting device having a first electrical conductor, and a second electrical conductor arranged to be displaced in a path from a fixed position. A plurality of discrete electrical conductors are arranged in tandem, and held in contiguous relationship between the first and second electrical conductors during normal circuit operating conditions. A plurality of chutes, arranged normal to the displacement path, are positioned in proximity to the electrical conductors. A member for displacing the second electrical conductor, moves the second electrical conductor a finite distance in response to a signal indicative of excessive current flow. When the second electrical conductor is displaced, a plurality of arcs are produced between successive discrete conductors, the debris products produced during arcing being exited through the chutes.

4 Claims, 7 Drawing Figures 3,764,851

CURRENT LIMITING DEVICE

CROSS-REFERENCE TO RELATED APPLICATIONS

See copending application for a Current Limiting Variable Resistance Device, Ser. No. 281,684, filed on Aug. 18, 1972 in the names of Derek A. Paice, Bryan J. Bixby and Thomas W. Slebodnik and assigned to the same assignee as the instant invention.

BACKGROUND OF THE INVENTION

1. Field of the Invention

This invention relates to an improved current limiting device.

2. Description of the Prior Art

Thyristor power converters are used almost exclusively in DC high power applications such as encountered in rolling mills, electrochemical plants and the like, where the speed of response and efficiency are important. When the current overload capabilities of these power converters are compared with those of equivalent DC generators, the latter are found to be considerably more robust. As a result the power converters require a fairly sophisticated and coordianted hierarchy of protection devices including gate pulse suppressors, fuses, circuit breakers, etc. The peripheral equipment therefore is considerable.

(It should be pointed out at this time that the invention to be described is equally applicable in the AC protection field.)

In the copending application for A Current Limiting Variable Resistance Device, cited supra, there is disclosed a current limiting device using a plurality of electrical conductors which are held under compressive force and then suddenly released under fault current conditions. The resulting controlled arcing between successive electrical conductor results in a finite drop (regardless of the current flowing) over a considerable range of current magnitudes, with the result that there is adequate protection for a serially connected circuit breaker, for example, to operate within the bounds of its design operating parameters. It has been found, however, that successive operation of the current limiting device over a period of time produces a deterioration of the surface of the electrical conductors with a result that the closed resistance is increased upsetting initial design parameters sufficiently to require replacement. Stated differently, the current limiting device has a different static resistance after say 10 operations than it did when initially actuated. This could be disadvantageous enough to require replacement.

The instant invention is designed to provide an improved current limiting device which will produce fairly constant closed ohmic resistance of the current limiting device under repeated operations, so that replacement problems are substantially mitigated.

SUMMARY OF THE INVENTION

In accordance with the principles of the invention there is provided an improved current limiting device comprising first and second electrical conducting means, the latter means being arranged to be displaced on a path from a fixed position. A plurality of discrete electrical conductors are arranged in tandem, and held contiguously between the first and second electrical conducting means during normal circuit operating conditions. A plurality of chutes are arranged normal to the displacement path and positioned in proximity to the electrical conductors. Means are provided for displacing the second electrical conducting means a finite distance in response to a signal indicative of excessive current flow. When the second electrical conducting means is displaced, a plurality of arcs are produced between successive conductors, the debris produced by arcing being exited through said chutes.

DESCRIPTION OF AN EXEMPLARY EMBODIMENT

Figure 1:
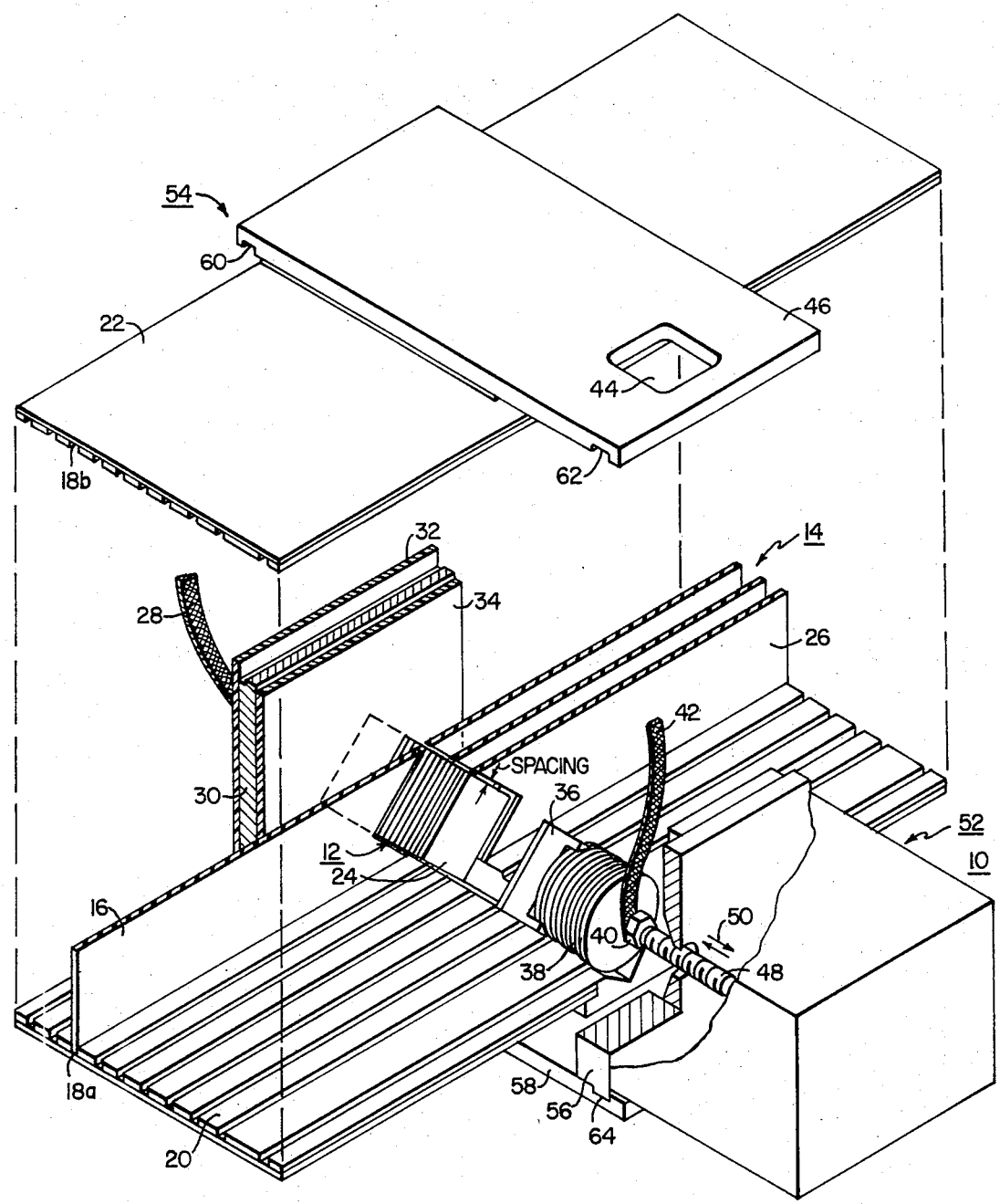
FIG. 1 is a schematic diagram of the improved current limiting device in accordance with one illustrative embodiment of the invention.

Referring now to FIG. 1, the current limiting device of the invention is indicated generally at 10. A plurality of discrete electrical conductors, here illustrated as graphite plates, are indicated generally at 12. A plurality of plasma chutes are indicated generally at 14; these chutes comprise insulating members which may be of micarta material, one such member being identified at 16. The member 16 is secured in troughs or slots 18a, 18b in members 20, 22 respectively. As may be seen from a study of FIG. 1, members 20, 22 contain a plurality of troughs or slots for receiving the insulating members similar to 16. One plasma chute is provided for a number of graphite plate conductors, for example one chute for 10 graphite plates. The spacing between an electrical conductor, for example 24, and a proximate chute member, for example 26 is somewhat critical, the closer the spacing the better the performance, with 30 mils being a good compromise between performance and physical realization.

At the left of the drawing as viewed in FIG. 1, the end graphite plate (not shown) is coated with copper and bonded to an aluminum plate to form a first electrical conducting means, electrical access being had by means of a braided copper flexible connector 28, which is connected to a stem secured to the aluminum plate, the entire combination being insulated from steel frame member 30 by means of an insulating bushing made of micarta. The frame member 30 is further insulated by means of micarta members 32 and 34.

At the other end of the graphite plates 12, the end plate conductor is similarly plated with copper and secueed to an aluminum plate 36 which forms a second electrical conducting means. A pluraltiy of Belleville washers 38 are arranged to function a spring means to force the graphite pile 12 under a compressive force. A nut 40 is screwed down against a stem (not shown) leading from the aluminum plate 36, to secure a conductor 42 which is in the form of a braided copper flexible connector. The flexible connector 42 is led up through an access hole 44 in frame member 46.

The nut 40 is on threaded member 48 which is actuated bidirectionally in the displacement path indicated by the arrows at 50, by means of a fast opening mechanism indicated generally at 52. The mechanism 52 contains repulsion coils which are actuated by a trigger pulse which is generated when a fault is detected, requiring current limiting performance from the device 10. (While repulsion coils are used here by way of illustration, any fast opening mechanism may be utilized.)

A steel housing is indicated generally at 54 and comprises: plate members 30, 46, 56 and 58. The plate member 30 fits into a slot (not shown) in plate 58 and into a slot 60 in plate member 46. Similarly plate member 56 fits into slot 62 in plate member 46 and into slot 64 in plate member 58.

Figure 2:
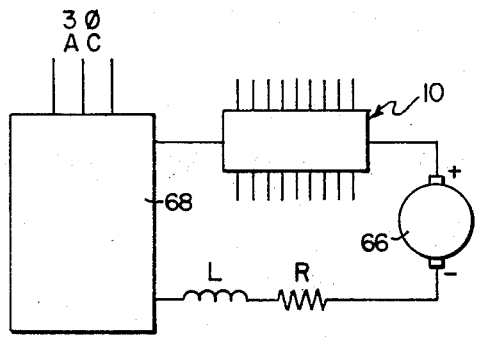
FIG. 2 is an illustrative practical utilization of the device shown in FIG. 1.

In FIG. 2, the current limiter 10 is shown in series with a DC motor 66 energized from a thyristor power converter identified at 68. The lumped resistors and inductance of the circuitry are identified at R and L, respectively. This arrangement affords protection for the power converter 68.

Figure 3:
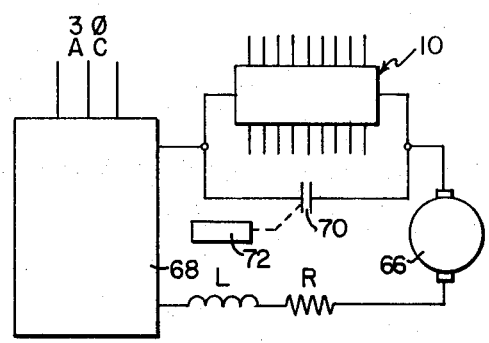
FIG. 3 is another illustrative practical utilization of the device of FIG. 1, the device including shunting contactors to limit steady state current.

FIG. 3 is similar to FIG. 2 but differs in that the current limiting device 10 is in parallel with shunt contacts 70 which are adapted to be opened by a fast opening mechanism 72 when a fault occurs. When a serious fault occurs (as in the case for certain modes of thyristor misfiring) the shunt contacts are rapidly opened, and the fault current is transferred to the still closed device 10 in about 1.3 ms after generation of a trigger pulse indicative of fault current. At this point the plate conductors separate, multiple arcing occurs, producing an arc voltage in series opposition to the voltage from the power converter 68 and the inductance L, the fault current begins to decrease. The operation of the device 10 per se will now be considered below.

OPERATION OF THE EXEMPLARY EMBODIMENT

When a voltage fault current occurs, a trigger pulse indicative of excessive current is generated causing the repulsion coils to displace the second electrical conducting means 36 to the right as viewed in FIG. 1. As a result of this, the plate conductors 12 are displaced a finite distance, so that arcing occurs between successive conductors.

The key to the successful operation of this small size current limiter lies in its ability to obtain a high arc voltage in relation to the voltage drop at rate current. The higher the arc voltage the greater will be the wear occurring at any particular magnitude of fault current; however, if the current can be reduced significantly then the power in the arc can be reduced.

The device can be operated either in the cathode voltage mode or the anode voltage mode. The cathode voltage mode results from a short arc, while the anode voltage mode results from a long arc. As may be expected, the distinction between long and short is relatively arbitrary, but for present purposes a short arc may reasonably be defined as physically about 1 mil long, while a long arc is in the order of ⅛th of an inch. The arc voltage is expected to vary with pressure as well as length, hence, the physical interpretation of short and long arcs may well be modified at different currents, because these currents will most likely create different pressures. When the plate conductors 12 are operated, the arc voltage drop of interset is that associated with the short arc, namely, the cathode voltage mode.

During normal conditions the graphite plate conductors 12 are under a fixed pressure to produce a predetermined resistance. The device described in the copending application of Derek A. Paice et al cited supra, has a finite service life because of the discrete increases in the closed resistance after each current limiting operation. These progressive resistive increments either cause the temperature to be excessive or make current commutation difficult. The present invention provides plasma chutes 14 which allow the debris products (namely sublimed carbon dust and occasionally dislodged chunks of graphite formed during arcing) to exit rapidly to the surrounding atmosphere under the discipline of the arc induced explosive forces, thereby helping to maintain the surfaces of the plate conductors relatively clean for an appreciably longer time. The forces causing separation of the plate conductors are probably a combination of current constriction and gas blast forces. The result is that the incremental increase in resistance is much more gradual, resulting in increased service life.

Figure 4:
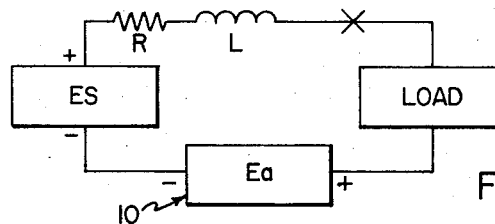
FIG. 4 is a circuit diagram used in explaining the operation of the device of the invention.
Figure 5A:
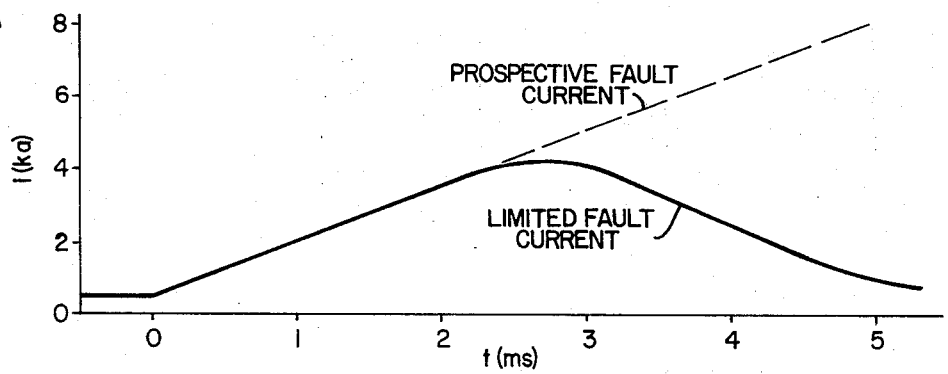
FIGS. 5A, 5B and 5C are voltage time curves used in explaining the operation of the FIG. 4 circuit.
Figure 5B:
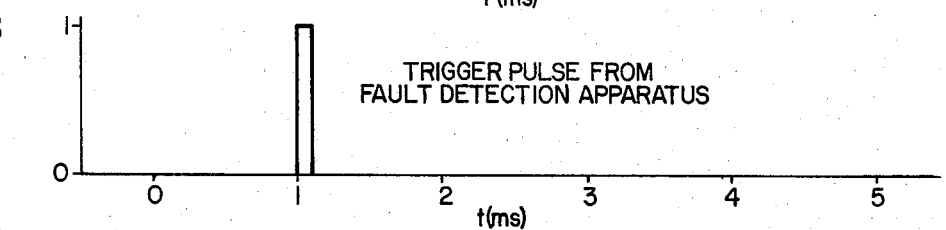
Figure 5C:
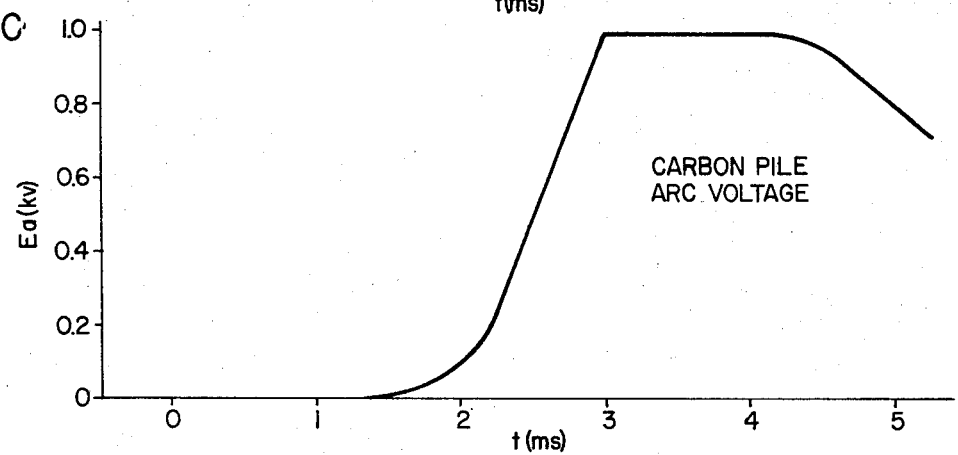

Further insight into the operation of the device may be had from a consideration of the circuit of FIG. 4 considered in connection with the voltage vs. time curves of FIGS. 5A, 5B, 5C. (The device 10 here uses plate conductors of carbon having a design magnitude of 1,000 volts for a 51 carbon plate pile.)

Referring now to FIG. 4 at $t = 0$ the normal circuit current is approximately 500 amperes (FIG. 5A). The device 10 is dissipating about 300 watts because of the 500 ampere current flowing. This amount of heat is easily removed by convection and/or conduction cooling.

At $t = 0$ a fault occurs, and the circuit current begins to rise (FIG. 5A) at the rate of 1.5 KA/ms which is determined by the lumped circuit inductance L. Assume that the system requires 1 millisecond to sense that a serious fault is present and to generate a command that the current limiter 10 be activated; this command is the trigger pulse of FIG. 5B.

The response to the current limiter 10 is depicted in FIG. 5C. At about 0.5 ms the fast opening mechanism 52 has displaced the second electrical conducting means 36 far enough for the first few plates to begin arcing. The process is cumulative and arcing increases until at $t = 3$ ms all the plate conductors are arcing. Now the circuit current FIG. 5A begins to decrease, the device developing an arcing voltage Ea which opposes that of the source Es. Maximum current limiting occurs when the device 10 reaches its full design magnitude 1,000 volts. As the circuit current drops to about 2,000 amperes, the voltage of the device 10 decreases (FIG. 5C) through self-adjustment. The circuit current then remains low until it is either interrupted or has been restored to normal by closing the current limiting device 10 after the fault has been cleared.

What we claim is:
1. An improved current limiting device comprising:
   a. first electrical conducting means;
   b. second electrical conducting means arranged to be displaced in a path from a fixed position;
   c. a plurality of discrete electrical conductors arranged in tandem, and contiguosuly held between said fisrt and second electrical conducting means during normal circuit operating conditions;

d. a plurality of chutes arranged normal to said displacement path and positioned in proximity to said electrical conductors; and e. means for displacing said second electrical conducting means a finite distance in response to a signal indicative of excessive current flow, whereby, when the second electrical conducting means is displaced, a plurality of arcs are produced between successive electrical conductors, the debris produced by arcing being exited through said chutes.

2. A current limiting device according to claim 1 including shunt contact means arranged in parallel with said plurality of electrical conductors, and being arranged to open circuit in response to said excessive current flow signal.

3. A current limiting device according to claim 1 wherein said electrical conductors comprise graphite material.

4. A current limiting device comprising:

a. first electrical conducting means;

b. second electrical conducting means arranged to be displaced in a path from a fixed position;

c. a plurality of discrete graphite conductors arranged in tandem, and contiguously held between said first and second electrical conducting means during normal circuit conditions;

d. a plurality of chutes having a longitudinal axis arranged normal to said displacement path, positioned in proximity to said graphite conductors;

e. means for displacing said second electrical conducting means a finite distance in response to a signal indicative of a fault current flow; and f. shunt contact means arranged electrically in parallel with said graphite conductors and being arranged to open circuit in response to said fault current flow signal, whereby when the second electrical conductor means is displaced, a plurality of arcs are produced between adjacent graphite conductors, the debris products from arcing being respectively exited through the proximate chute.

* * * * *